(12) United States Patent
Hars

(10) Patent No.: US 6,947,960 B2
(45) Date of Patent: Sep. 20, 2005

(54) RANDOMNESS TEST UTILIZING AUTO-CORRELATION

(75) Inventor: Laszlo Hars, Cortlandt Manor, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 542 days.

(21) Appl. No.: 10/081,896

(22) Filed: Feb. 21, 2002

(65) Prior Publication Data

US 2003/0158875 A1 Aug. 21, 2003

(51) Int. Cl.[7] .................................................. G06F 1/02
(52) U.S. Cl. ....................................................... 708/250
(58) Field of Search ................................. 708/250, 426

(56) References Cited

U.S. PATENT DOCUMENTS

| | | | | | |
|---|---|---|---|---|---|
| 4,355,366 | A | * | 10/1982 | Porter | ......................... 708/255 |
| 4,590,601 | A | * | 5/1986 | Beeman | ...................... 375/367 |
| 5,754,603 | A | * | 5/1998 | Thomas et al. | ............. 375/367 |
| 6,314,440 | B1 | * | 11/2001 | O'Toole et al. | ............. 708/250 |

OTHER PUBLICATIONS

"Efficient online tests for true random number generation", by Schindler, Cryptographic Hardware and Embedded Systems, 3$^{rd}$ International Workshop, CHES 2001, Paris, France, May 14–16, 2001, vol. 2162, pp. 103–117.
"Handbook of Applied Cryptography", by A. J> Menezes et al, 1997, CRC Press, pp. 181–182.

* cited by examiner

Primary Examiner—Tan V. Mai
(74) Attorney, Agent, or Firm—Kevin Simons

(57) ABSTRACT

A method and apparatus for testing the random numbers generated by a random number generator in real time. As a series of random numbers are generated, a plurality of the last numbers are stored, then the stored random numbers are shifted by predetermined amounts to obtain a special kind of dot product of bit sequences between the stored random numbers and the shifted random numbers. The average autocorrelation values are computed each time a new random bit is generated. Thereafter, it is determined whether the generated random numbers are not sufficiently random by comparing the average autocorrelation values to predetermined acceptance ranges.

21 Claims, 2 Drawing Sheets

```
a  =  1 ┊ 0 ┊ 1 ┊ 1 ┊ 0 ┊ 1 ┊ 1 ┊ 0 ┊ 0 ┊ 1 ┊ - - - - b  =    ┊ 1 ┊ 0 ┊ 1 ┊ 1 ┊ 0 ┊ 1 ┊ 0 ┊ 0 ┊ 0 ┊ 1 - - - -

A  =    ┊ -1┊ -1┊ +1┊ -1┊ -1┊ +1┊ +1┊ +1┊ -1┊  - -
```

RANDOMNESS TEST UTILIZING AUTO-CORRELATION

BACKGROUND OF THE INVENTION

1. Field of the Invention

The invention relates to the field of random-number generators and, in particular, to a random number generator that generates true binary random sequences.

2. Description of the Related Art

Random-number generators are fundamentally important in the computer age. A truly random sequence is difficult to generate in real application. For example, heat is typically generated in the hardware component of the random number generator when it generates a series of 1's and 0's over a time period. Generating a 1 bit could consume more power than a 0 bit. As such, if a long sequence of 1 bits is generated, the electrical circuit becomes hot. Thus, if the circuit generates a 1 bit when it is hot, the circuit will "latch up" and generate mostly 1 bits but rarely a 0 bit. A different effect may occur if a 0 bit is generated when the circuit is hot. In this case a long sub-sequence of 1 bits becomes too rare, which constitute a non-random property. In cryptographic application this may have catastrophic consequences of breaching security.

Accordingly, both the detection of hardware tampering and a component failure are necessary when conducting randomness tests. Conventional randomness tests are performed through extensive statistical testing, such as chi-squared tests, delta tests, and the like, on a sequence of generated random numbers. However, such tests are very expensive to be performed in real time as they require a great amount of computational processing power.

SUMMARY OF THE INVENTION

The present invention overcomes the above-described problems, and provides additional advantages by providing a method and apparatus for providing an on-line randomness test to ensure that the generated random numbers are sufficiently random.

According to an aspect of the invention, a method of evaluating random numbers generated by a random number generator is provided. The method comprising the steps of: generating a continuous stream of random bits; storing the generated random bits in a memory medium; shifting the stored random sequences by predetermined amounts; computing modified products of bit sequences between the stored random sequences and the shifted random sequences to determine an average correlation value; and, determining whether the generated random numbers are sufficiently random by comparing the determined average correlation value to a predetermined acceptance range. The value of the modified products is one of −1's and +1's. The method further comprising the steps of determining that the generated random numbers are not sufficiently random when any of the average autocorrelation values does not fall within the predetermined acceptance range; notifying that the generated random sequences are not sufficiently random when any of the average autocorrelation values falls outside the predetermined acceptance range; and, generating a new set of random sequences when any of the average autocorrelation values falls outside the predetermined acceptance range.

According to another aspect of the invention, a method of evaluating the random numbers generated by a random number generator includes the steps of: (a) generating and storing a stream of random bits using the random number generator; (b) shifting the stored random sequences by a predetermined amount; (c) computing modified products of bit sequences of the stored random numbers and the shifted random numbers; (d) performing exponential averaging operations (A) on the modified products to obtain average autocorrelation values; (e) comparing the average autocorrelation values to predetermined acceptance ranges; and, (f) determining that the generated random numbers are not sufficiently random when any of the average autocorrelation values falls outside the predetermined acceptance ranges. The method further includes the step of: repeating the steps (a)–(e) until any of the computed exponential averaging operations (A) falls outside the predetermined acceptance range; notifying that non-random numbers are generated when the steps (a)–(e) are repeated more than a predetermined number of times; and, generating a new set of random numbers when the steps (a)–(e) are repeated more than a predetermined number of times.

According to another aspect of the invention, the above methods further includes the step of calculating and applying the modified products to a plurality of exponential averaging operations (A) each time a new bit is generated, and determining that the generated random numbers are not sufficiently random when the output of any of the exponential averaging operations (A) falls outside the predetermined acceptance range, wherein the exponential averaging operations (A) are updated according to the following equation:

$$A_{new} = \alpha \cdot A_{old} \pm 1,$$

wherein $\alpha = 1 - 1/n$, and $\alpha$ falls between 0 and 1 ($0 < \alpha < 1$).

According to a further aspect of the invention, an apparatus for evaluating the random numbers generated by a random number generator includes: a random generator unit for generating random sequences comprising of binary bits; a detector unit, coupled to the output of the random generator unit, for detecting whether the generated random sequences are unpredictable; and, a switching unit, coupled to the outputs the random generator and the detector unit, for disabling the flow of the generated random sequences for a subsequent application when the generated random sequences are determined to be insufficiently random, wherein the generated random bits are stored and shifted by a predetermined amount to obtain modified products of bit sequences between the stored random sequences and the shifted random sequences, the modified products applied to exponential averaging operations (A) to determine an average autocorrelation value and wherein, if the output of any of the exponential averaging operations (A) falls outside a predetermined acceptance range, determining that the generated random sequences are not sufficiently random. The apparatus further comprising means for transmitting an alarm signal when any of the output of the exponential averaging operations (A) falls outside the predetermined acceptance range.

These and other advantages will become apparent to those skilled in this art upon reading the following detailed description in conjunction with the accompanying drawings.

DETAILED DESCRIPTION OF THE EMBODIMENT

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments, which depart from these specific details. For purposes of simplicity and clarity, detailed descriptions of well-known devices, circuits, and methods are omitted so as not to obscure the description of the present invention with unnecessary detail.

Figures 1, 2:
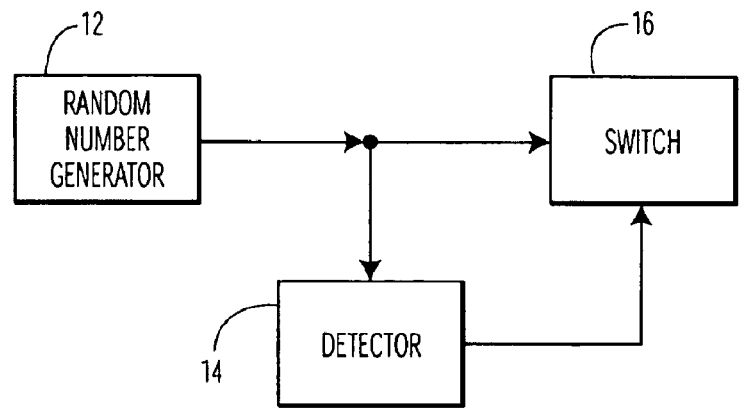
FIG. 1 illustrates a simplified block diagram of the randomly generating module according to an embodiment of the present invention.
FIG. 2 shows a diagram showing the randomness test performed on a sequence of random numbers according to an embodiment of the present invention; and, FIG. 3 is a flow chart illustrating the operation steps of testing the statistics of the generated random numbers according to an embodiment of the present invention.

FIG. 1 shows a block diagram of a system 10 capable of testing the statistics of the generated random numbers in real time according to an exemplary embodiment of the present invention. The system 10 incorporates a random-number generator (RG) 12, a detector 14, and a switch 16. The RG 12 is operable to output a series of random numbers. In this disclosure the term, "random number" means any sequence of binary signals, a Gaussian or any other distribution of signals, a sequence of signals representing a number between zero and one, a sequence of signals representing a decimal number, or any other form that includes the desired randomness. Also, the RG 12 means any device that produces a signal that can be converted to sequence of binary bits. Thus, the RG 12, in this disclosure, generates binary random bits in any conventional or unconventional manner.

The detector 14 detects whether the RG 12 is operating properly to produce random data that is sufficiently random for many purposes. Thus, the random numbers outputted by the RG 12 are tested for their randomness according to predetermined criteria (explained later); if they pass, the switch 16 allows the generated random numbers for a subsequent application, such as any circuit, system, process, gambling application, simulation, statistical sampling, Diffie-Hellman key exchanges, or the like which uses the random numbers supplied by the RG 12. For example, the switch 16 may represent an input to a cryptography system, an audio or video noise generator, a computer program, or other devices and processes. Thus, the switch 16 is deactivated, under the control of the detector 14, to stop the transmission of the generated random numbers when the generated random numbers are deemed insufficiently random.

Now, a description will be made in detail in regards to testing the statistical quality of the random sequence with reference to FIGS. 2 and 3.

Referring to FIG. 2, the random numbers are tested in real time while the RG 12 is in operation to ensure that the generated random numbers are sufficiently random according to an embodiment of the present invention. In operation a continuous stream of random bits is generated by the RG 12. Given these random numbers received from the RG 12, an autocorrelation test is run to ensure that the generated random number pattern will be irregular. As shown in FIG. 2, the initial random sequence, a, is stored, then shifted to the right by a specified amount. Although FIG. 2 shows a shift of one slot to the right for illustrative purposes, it should be understood that the present invention can support a much larger shift. Thus, the number of shifts in the drawing should not impose limitations on the scope of the invention. The initial sequence, a, is compared to the newly shifted sequence, b, in their respective slot to obtain a modified dot product of the 2-bit sequences. If the binary value in a given slot is the same (if $a_i = b_i$), the corresponding term to be summed up is assigned to +1 value; otherwise, it is assigned to −1 (if $a \ne b$). These terms are added together to form the modified dot product of the 2 bit sequences, it is counted for how many positions have the same bits as its shifted versions minus the number of different bits. For the generated sequence to be truly random according to the embodiment of the present invention, the number of −1 and +1 terms must be roughly the same. Here, "roughly" means that, taking n samples, the frequency of −1's and +1's occurrences must fall within a predetermined threshold range, which is smaller than n.

Some of the advantages of the present invention described above can be more easily seen in numeric expressions as follows. For the bit sequence of $b_0, b_1, b_2, b_3 \ldots$, the k-length auto-correlation vector starting at $b_0$ is as follows. Here if we interpret $\ominus$ as a kind of abstract multiplication operation, whose result is +1 if both operations are the same, −1 if different, the components of the auto-correlation vector:

$$a_1 = b_0 \ominus b_1 + b_1 \ominus b_2 + b_2 \ominus b_3 + \ldots + b_{k-1} \ominus b_k$$

$$a_2 = b_0 \ominus b_2 + b_1 \ominus b_3 + b_2 \ominus b_4 + \ldots + b_{k-1} \ominus b_{k+1}$$

$$\ldots$$

$$a_k = b_0 \ominus b_k + b_1 \ominus b_{k+1} + b_2 \ominus b_{k+2} + \ldots + b_{k-1} \ominus b_{2k-1}$$

Note that the consecutive values of $a_i$ have many common elements. For example, denoting by $_i a_m$ the correlation value starting at $b_i$ with offset m:

$$_0 a_1 = b_0 \ominus b_1 + b_1 \ominus b_2 + b_2 \ominus b_3 + \ldots + b_{k-1} \ominus b_k \text{ and}$$
$$_1 a_1 = b_1 \ominus b_2 + b_2 \ominus b_3 + b_3 \ominus b_4 + \ldots + b_k \ominus b_{k+1}.$$

Note that only the first term of $_0 a_1$ and the last term of $_1 a_1$ are not repeated. Thus, storing past bits or the previously calculated 2-bit products $b_i \ominus b_{i+1}$ allows us to calculate the whole auto-correlation vector in time that is proportional to its length, k. Furthermore, to save storage and execution time, exponential averaging to the auto-correlation calculations is applied in the present invention; however, other types of averaging techniques known to those skilled in this art can be used. The exponential averaging has the property, such that each time the average is updated in an accumulator A, the old averaged values will have a diminishing effect. The test to evaluate the statistical quality of the random sequence runs continuously, thus the counters must be cleared periodically when the exponential averaging was not used.

The exponential averaging works in the following way: Each time a numeric value b is obtained, a factor, $\alpha$, which falls between 0 and 1 ($0<\alpha<1$), is multiplied to the accumulator A and then b gets added to it: $A_{new}=\alpha \cdot A_{old}+b$. To have useful averaging effects, the value for $\alpha$ is selected to be close to 1, $\alpha=1-1/n$, $n>>1$. In this case, $\log \alpha \approx -1/n$ and the half-life of the averaged bit is $k \approx n \cdot \log 2 \approx 0.30103 \cdot n$. After n bits the weight of the oldest bit becomes $(1-1/n)^n \approx 1/e \approx 0.367879$. Here, e is the basis of the natural logarithm (the Euler constant), so the term, n, can be referred as the natural life of a bit. If all values to be averaged were 1's, the accumulator value is $1+\alpha+\alpha^2+\ldots =1/(1-\alpha)=n$, whereas if all bits were 0's the accumulator value is 0. Note that the expected value of the exponential average is the exponential average of the expected values of the individual values.

The exponential auto-correlation vector starting at $b_0$ is defined by the following infinite sums:

$$e_1 = b_0 \ominus b_1 + \alpha \cdot b_1 \ominus b_2 + \alpha^2 \cdot b_2 \ominus b_3 + \ldots$$

$$e_2 = b_0 \ominus b_2 + \alpha \cdot b_1 \ominus b_3 + \alpha^2 \cdot b_2 \ominus b_4 + \ldots$$

$$\ldots$$

$$e_k = b_0 \ominus b_k + \alpha \cdot b_1 \ominus b_{k+1} + \alpha^2 \cdot b_2 \ominus b_{k+2} + \ldots$$

A few advantages of the exponential auto-correlation are (denoting by $_i e_m$ the exponential correlation value starting at $b_i$ with offset m) as follows:

(1) Consecutive values of the auto-correlation vectors are easier to calculate:

$$_i e_m = b_i \ominus b_{i+m} + \alpha \cdot {_{i+1}e_m};$$

(2) Only the last k bits need to be stored (as opposed to 2k with standard correlation); and, (3) With the parameter $\alpha=1-1/n$, (n being the natural life of correlation terms) the effective length of correlation can be easily (even dynamically) changed.

As described above, the exponential averaging serves to clear the counter as the accumulator is decreased with a certain $0<\alpha<1$ factor; thus, the accumulator never becomes too large during the operation mode. Once the exponential averaging is performed for each accumulator, the value of exponential averaging is compared to a predetermined acceptance range. In the embodiment, it is determined whether the generated random number pattern will be substantially random by comparing the value of each accumulator to the predetermined acceptance range value. If the value of any accumulator falls out of the predetermined range value during the averaging process, it is inferred that the generated random numbers would not be unpredictable. Alternatively, a threshold value may be set to notify the user when the test fails repeatedly. As such, the exponential averaging limits can be determined beforehand using a set of known good quality random sequences such that these random sequences all fall into the acceptable range. The actual range used in the test is selectively set by an operator so that a choice can be made of different sensibility as to whether the generated random sequence is predictable to an unauthorized party.

Figure 3:
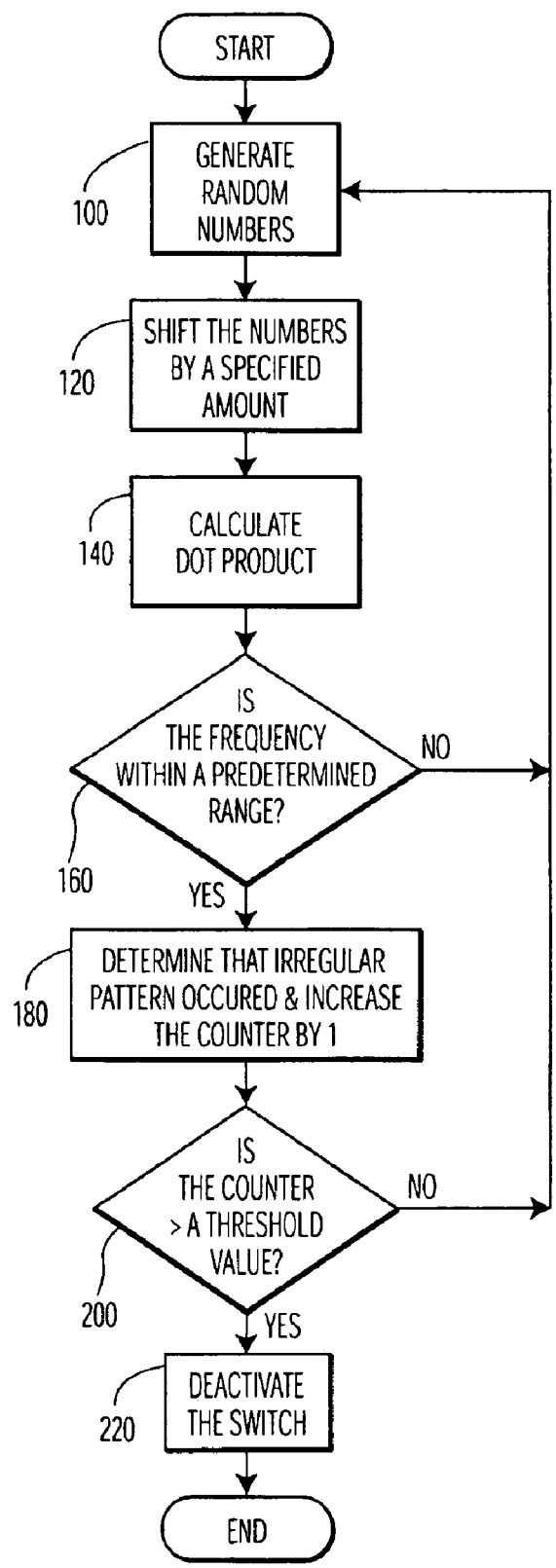

FIG. 3 is a flow chart illustrating the operation steps for testing the statistical quality of the random sequence in accordance with the present invention. The rectangular elements indicate computer software instruction, whereas the diamond-shaped element represents computer software instructions that affect the execution of the computer software instructions represented by the rectangular blocks. Alternatively, the processing and decision blocks represent steps performed by functionally equivalent circuits such as a digital signal processor circuit or an application-specific-integrated circuit (ASIC). It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention.

In operation, a continuous random stream of binary bits is generated by the random-number generator 12 in step 100. A chosen number, k, of the generated last random bits are stored in a ring-buffer, then the stored random numbers are read and processed for comparison purposes in step 120. The special products of the lastly generated random numbers and all the stored random numbers are computed in step 140. Thereafter, the exponential averaging accumulators are updated with the products, either –1 or +1, and the accumulators are compared to a predetermined acceptance range in step 160. If any of the accumulators is outside the predetermined acceptance range, it is determined that regular patterns have been detected in step 180, and the counter is increased by 1. Otherwise, the step returns to step 100 of generating random numbers, and the counter is reset. In step 200, if the value of the counter is greater than the threshold value in step 200, the switch 16 is deactivated to stop the flow of the random numbers for a subsequent application in step 220. At this time, the generated random numbers can be discarded, and the whole process of generating new random numbers can be initiated. Alternatively, a notice that the generated random numbers are not sufficiently random can be made to the operator. Finally, if the value of the counter does not exceed the threshold value in step 200, the processing is returned to step 100.

The various steps described above may be implemented by programming them into functions incorporated within application programs, and programmers of ordinary skill in the field can implement them using customary programming techniques in languages, such as C, Visual Basic, Java, Perl, C++, and the like. In an exemplary embodiment, the method described in FIG. 3 may be constructed as follows (using the C programming language). For simplicity we implemented the test using floating-point arithmetic.

```
BitGenInit(argc, argv);
for(j = 0; j < OFFSETS; ++j) {      // at first j=0: offset 8, j=1: 7,... j=7: offset 1
    bits[j] = NextBit();            // set up circular buffer of last few bits
    a[j] = AV;                      // ideal past
    x[j] = 0.0;                     // max for debug, eval
    y[j] = 1e9; }                   // min for debug, eval for(i = OFFSETS; i < n; ++i) {
    b = NextBit();
    for(j = 0; j < OFFSETS; ++j) {  // j=CIRC[i]: offset 8,... j=CIRC[i+7]: offset 1
        a[j] = a[j]*w + (bits[CIRC(i+j)]==b);
        x[j] = MAX(a[j],x[j]);      // for debug, eval
        y[j] = MIN(a[j],y[j]);      // for debug, eval
        if (a[j] < LO || a[j] > HI) {
            printf("At bit %d the offset %d autocorrelation %g is out of range\n",i,OFFSETS-j,a[j]);
            exit(2); }
    }
    bits[CIRC(i)] = b;
}
printf("No large or small autocorrelation\n");
for(j = 0; j < OFFSETS; ++j) printf("%g  %g\n", y[j], x[j]);  // show the results for debug, eval
}
```

While the preferred embodiments of the present invention have been illustrated and described, it will be understood by those skilled in the art that various changes and modifications may be made and equivalents substituted for elements thereof without departing from the true scope of the present invention. In addition, many modifications can be made to adapt to a particular situation and the teaching of the present invention without departing from the central scope. Therefore, it is intended that the present invention not be limited to the particular embodiment disclosed as the best mode contemplated for carrying out the present invention, but that the present invention include all embodiments falling within the scope of the appended claims.

What is claimed is:

1. A method for evaluating random numbers generated by a random number generator, the method executed by a processing device comprising the steps of:

generating a continuous stream of random bits;

storing said generated random bits in a memory medium;

shifting said stored random sequences by a predetermined amount, computing modified products of bit sequences between said stored random sequences and said shifted random sequences to determine an average auto correlation value; and, determining whether said generated random numbers are sufficiently random by comparing said determined average auto correlation value to a predetermined acceptance range.

2. The method of claim 1, wherein the value of said modified products is one of −1's and +1's.

3. The method of claim 2, further comprising the step of determining that said generated random numbers are not sufficiently random when any of the average autocorrelation values does not fall within said predetermined acceptance range.

4. The method of claim 2, further comprising the step of notifying that said generated random sequences are not sufficiently random when any of the average autocorrelation values falls outside said predetermined acceptance range.

5. The method of claim 2, further comprising the step of generating a new set of random sequences when any of the average autocorrelation values falls outside said predetermined acceptance range.

6. The method of claim 1, further comprising the step of applying said dot products to a plurality of exponential averaging operations (A) each time a new bit is generated.

7. The method of claim 6, wherein said exponential averaging operations (A) are updated according to the following equation:

$$A_{new} = \alpha \cdot A_{old} \pm 1,$$

wherein $\alpha = 1 - 1/n$, and $\alpha$ falls between 0 and 1 ($0 < \alpha < 1$).

8. The method of claim 6, further comprising the step of determining that said generated random numbers are not sufficiently random when the output of any of said exponential averaging operations (A) falls outside said predetermined acceptance range.

9. A method for evaluating the random numbers generated by a random number generator, the method executed by a processing device comprising the steps of:

(a) generating and storing a stream of random bits using said random number generator;

(b) shifting said stored random sequences by a predetermined amount;

(c) computing modified products of bit sequences between said stored random numbers and said shifted random numbers;

(d) performing exponential averaging operations (A) on said modified products to obtain average autocorrelation values;

(e) comparing the average autocorrelation values to a predetermined acceptance range; and, (f) determining that said generated random numbers are not sufficiently random when any of the average autocorrelation values falls outside said predetermined acceptance range.

10. The method of claim 9, further comprising the step of:

repeating said steps (a)–(e) until any of said computed exponential averaging operations (A) falls outside said predetermined acceptance range.

11. The method of claim 9, further comprising the step of notifying that non-random numbers are generated when said steps (a)–(e) are repeated more than a predetermined number of times.

12. The method of claim 9, further comprising the step of generating a new set of random numbers when said steps (a)–(e) are repeated more than a predetermined number of times.

13. The method of claim 9, further comprising the step of updating said exponential averaging operation (A) according to the following equation:

$$A_{new} = \alpha \cdot A_{old} \pm 1,$$

wherein $\alpha = 1 - 1/n$, and $\alpha$ falls between 0 and 1 ($0 < \alpha < 1$).

14. An apparatus for evaluating the random numbers generated by a random number generator, comprising:

a random generator unit for generating random sequences comprising of binary bits;

a detector unit, coupled to the output of said random generator unit, for detecting whether said generated random sequences are sufficiently random; and, a switching unit, coupled to the outputs said random generator and said detector unit, for disabling the flow of said generated random sequences for a subsequent application when said generated random sequences are determined to be insufficiently random, wherein said generated random bits are stored and shifted by a predetermined amount to obtain modified products of bit sequences between said stored random sequences and said shifted random sequences, said modified products applied to exponential averaging operations (A) to determine an average autocorrelation value and wherein, if the output of any of said exponential averaging operations (A) falls outside a predetermined acceptance range, determining that said generated random sequences are insufficiently random.

15. The apparatus of claim 14, further comprising means for transmitting an alarm signal when any of the output of said exponential averaging operations (A) falls outside said predetermined acceptance range.

16. The apparatus of claim 14, wherein said exponential averaging operation (A) is performed according to the following equation:

$$A_{new}=\alpha \cdot A_{old} \pm 1,$$

wherein $\alpha=1-1/n$, and $\alpha$ falls between 0 and 1 ($0<\alpha<1$).

17. A machine-readable medium having stored thereon data representing sequences of instructions, and the sequences of instructions which, when executed by a processor, cause the processor to:
- store a plurality of bits of externally generated random sequences of binary bits;
- shift said stored random sequences by predetermined amounts;
- compute a modified dot product of bit sequences between said stored random sequences and said shifted random sequences to determine an average autocorrelation value; and,
- determine whether said generated random numbers are sufficiently random by comparing all said determined average autocorrelation values to a predetermined acceptance range.

18. The memory medium of claim 17, wherein said generated random numbers are determined to be insufficiently random when any of the average autocorrelation values falls outside said predetermined acceptance range.

19. The memory medium of claim 17, wherein said processor is further operative to generate a new set of random bits when any of the average autocorrelation values falls outside said predetermined acceptance range.

20. The memory medium of claim 17, wherein said processor is further operative to apply said modified product to an exponential averaging operation (A) each time a new bit is generated.

21. The memory medium of claim 20, wherein said exponential averaging operation (A) is computed according to the following equation:

$$A_{new}=\alpha \cdot A_{old} \pm 1,$$

wherein $\alpha=1-1/n$, and $\alpha$ falls between 0 and 1 ($0<\alpha<1$).

* * * * *